S. R. BERGMAN.
DYNAMO ELECTRIC MACHINE.
APPLICATION FILED OCT. 23, 1919.

1,334,832.

Patented Mar. 23, 1920.

Inventor:
Sven R. Bergman,
by *His Attorney.*

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,334,832.     Specification of Letters Patent.     Patented Mar. 23, 1920.

Continuation of application Serial No. 142,748, filed January 16, 1917. This application filed October 23, 1919. Serial No. 332,672.

*To all whom it may concern:*

Be it known that I, SVEN R. BERGMAN, a subject of the King of Sweden, residing at Nahant, in the county of Essex, State of Massachusetts, have invented certain new and useful Improvements in Dynamo-Electric Machines, of which the following is a specification.

My invention relates to dynamo electric machines and its object is to provide a dynamo electric machine having an improved field winding, which operates in part to compensate for the armature reaction and in part to produce exciting flux, and which is applicable to either a direct current or an alternating current dynamo electric machine.

This application is a continuation of my prior application, Serial No. 142,748, filed January 16, 1917.

Figure 1:
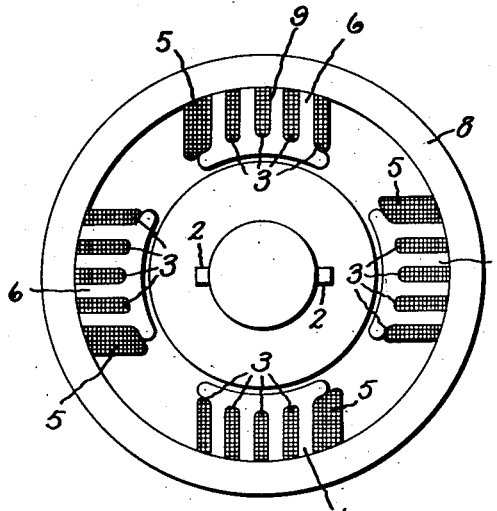
Figure 2:
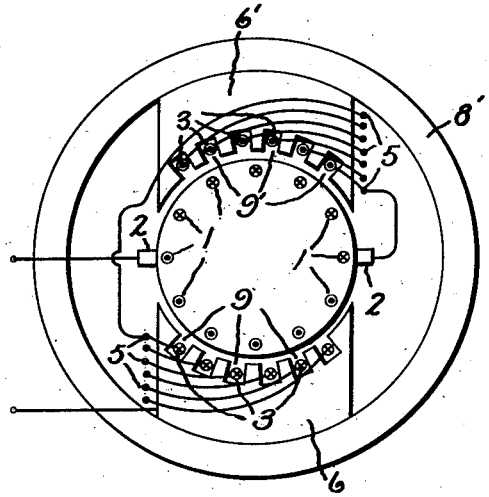
Figure 3:
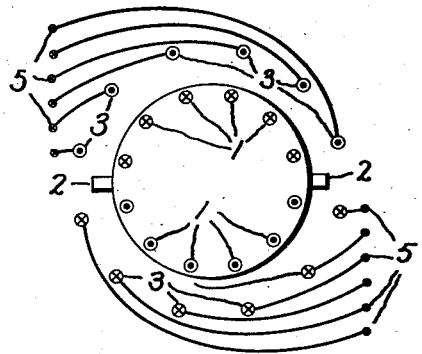

The novel features which I believe to be patentably characteristic of my invention are definitely indicated in the claims annexed hereto. The principle of the invention and its application to and embodiment in dynamo electric machines will best be understood from the following description taken in connection with the accompanying drawing, in which Figure 1 is a view partly in section, of a dynamo electric machine embodying my invention, and Figs. 2 and 3 are diagrammatic views of the windings of the machine of Fig. 1.

The dynamo electric machine diagrammatically represented in the drawing has a commutated armature winding 1 and co-operating commutator brushes 2. A completely distributed compensating winding 3 is carried in distributed slots in the stationary field magnet. The conductors of the distributed field winding 3 form one side of a plurality of coils of which the conductors of the other side 5 thereof are concentrated. In other words, the concentrated conductors 5 are the return conductors of the distributed conductors of the compensating winding 3. The field winding 3—5 is designed to be connected in series with the armature winding 1, and the distributed conductors of the compensating component 3 thereof, have substantially the same number of ampere turns, as the portion of the armature winding directly beneath the distributed conductors and therefore are proportioned to just neutralize the armature magnetization. The two groups of concentrated conductors 5 form in effect the two sides of a concentrated exciting coil whose magnetizing axis is electrically in quadrature with the magnetizing axis of the armature winding. The concentrated conductors 5 thus constitute the exciting winding of the machine, and consequently, produce a series exciting flux. In Figs. 1 and 2, I have shown practical arrangements of this winding. Magnetic poles 6 or 6' are secured in any suitable manner to a magnetic stator frame 8 or 8' and are provided with uniformly distributed slots 9 or 9' in which are carried the uniformly distributed conductors 3, while the return conductors 5 therefor are wound around one end of the pole. In practice, the distributed conductors 3 need not be uniformly distributed over the entire 180 electrical degrees of the armature winding whose reaction is to be compensated thereby. The distribution of the conductors 3 which is represented in Fig. 2 gives a close enough approximation of complete neutralization of the armature reaction for all practical purposes. Indeed, for most practical purposes, the ratio of the total number of ampere turns of the distributed compensating conductors 3 to the total number of ampere turns of the armature conductors 1 and the electrical arc spanned by the distributed conductors 3 is relatively unimportant, so long as the distributed compensating conductors have substantially the same number of ampere turns as the portion of the armature winding directly beneath the compensating conductors.

In the machine illustrated, the complete field winding is composed of coils of which the conductors of half of each turn act magnetically to neutralize, in whole or in part, the armature reaction, while the conductors of the other half of each turn act to produce an exciting flux. In other words, the conductors of half of each coil of this complete field winding are distributed and act, in whole or in part, as a compensating winding, while the return conductors for such distributed conductors, that is the conductors of the other half of each coil of the winding, are concentrated and act to produce an exciting flux for the machine. This machine is a compensated series machine. Due to its peculiar distribution, the improved field winding of my present invention herein particularly described, has a relatively small mean-length-of-turn, even smaller than in an ordinary field coil spanning the whole pole.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A dynamo-electric machine comprising an armature winding, and a field winding having a plurality of spaced conductors electrically connected to a single group of return conductors, the magnetizing effect of said single group of return conductors considered alone being substantially in quadrature with the axis of magnetization of said armature winding while the magnetizing effect of said spaced conductors is such as to substantially neutralize the armature reaction of the machine.

2. A dynamo-electric machine comprising an armature winding, and a field winding having a plurality of spaced conductors and a single group of return conductors, each of said spaced conductors being directly connected in series with a conductor in said single group of return conductors, the magnetizing action of said field winding as a whole being such as to substantially neutralize the armature reaction of the machine and to produce in addition an exciting flux substantially in quadrature with the axis of magnetization of said armature winding.

3. A dynamo-electric machine comprising an armature winding, and a field winding connected in series relation with said armature winding and having a plurality of spaced conductors electrically connected to a single group of return conductors, the magnetizing strength of said spaced conductors being substantially equal to the magnetizing strength of said armature winding.

4. A dynamo-electric machine comprising an armature winding, and a field winding connected in series relation with said armature winding, the magnetizing effect of all of the conductors of one-half of each turn of said field winding being such as to substantially neutralize the armature reaction of the machine while the magnetizing effect of all the conductors of the other half of each turn of said field winding is such as to produce an exciting flux substantially in quadrature with the axis of magnetization of said armature winding.

5. A dynamo electric machine comprising an armature winding, and a field magnet structure provided with poles, a field winding on said poles having a plurality of spaced conductors and a single group of return conductors, each complete turn of said field winding consisting of one of said spaced conductors and one of said return conductors, said spaced conductors being uniformly distributed over substantially the entire pole face so as to substantially neutralize the armature reaction.

6. A dynamo electric machine comprising an armature winding, and a field winding having a pluralty of spaced conductors and a single group of return conductors, each complete turn of said field winding consisting of one of said spaced conductors and one of said return conductors, said spaced conductors having substantially the same number of ampere turns as the armature winding directly beneath said field winding.

7. A dynamo electric machine comprising an armature winding and a field magnet structure provided with poles, a field winding on said poles having a plurality of spaced conductors and a single group of return conductors, each complete turn of said field winding consisting of one of said spaced conductors and one of said return conductors, said spaced conductors being uniformly distributed over substantially the entire pole face, the magnetizing effect of said single group of said return conductors considered alone being substantially in quadrature with the axis of magnetization of said armature winding, while the magnetizing effect of said spaced conductors is such as to substantially neutralize the armature reaction of the machine.

8. A dynamo electric machine comprising an armature winding and a field magnet structure provided with poles, a field winding on said poles having a plurality of spaced conductors and a single group of return conductors, each complete turn of said field winding consisting of one of said spaced conductors and one of said return conductors, said spaced conductors being uniformly distributed over substantially the entire pole face and having substantially the same number of ampere turns as the armature winding directly beneath said spaced conductors, the magnetizing effect of said single group of said return conductors considered alone being substantially in quadrature with the axis of magnetization of said armature winding, while the magnetizing effect of said spaced conductors is such as to substantially neutralize the armature reaction of the machine.

In witness whereof I have hereunto set my hand this twentieth day of October, 1919.

SVEN R. BERGMAN.